Oct. 25, 1966 R. C. HENSHAW 3,280,970
SHIPPING CONTAINER MOUNTING
Filed June 15, 1965
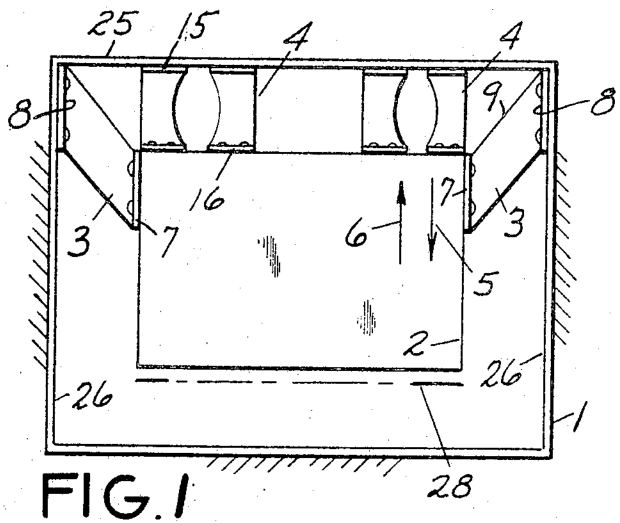
FIG. 1
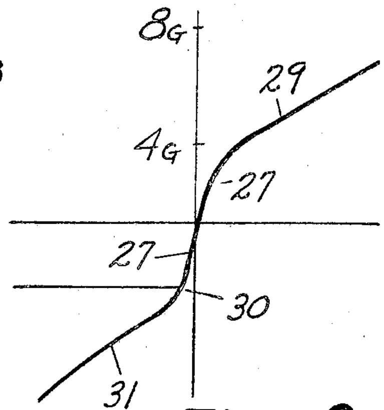
FIG. 2
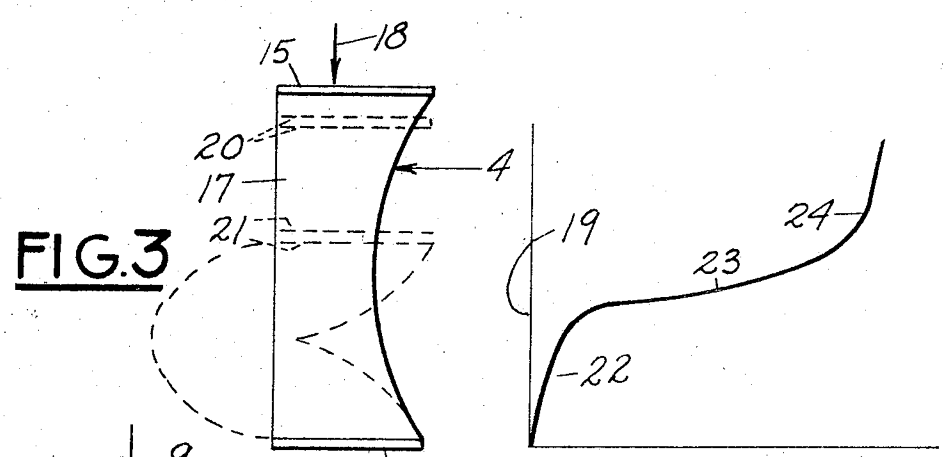
FIG. 3
FIG. 4
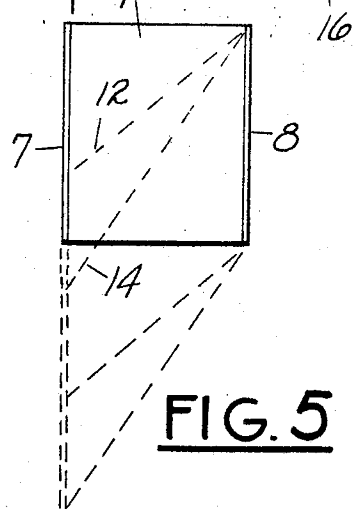
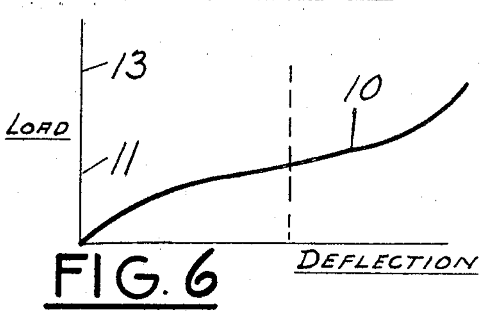
FIG. 6
FIG. 5
INVENTOR.
Richard C Henshaw
BY
Ralph Hammar
Attorney 3,280,970
Patented Oct. 25, 1966

3,280,970

SHIPPING CONTAINER MOUNTING

Richard C. Henshaw, Erie, Pa., assignor to Lord Corporation, Erie, Pa., a corporation of Pennsylvania Filed June 15, 1965, Ser. No. 464,039
2 Claims. (Cl. 206—46)

This invention is a shipping container mounting which improves the shock protection by a relatively stiff buckling type mounting arranged in parallel with a relatively soft shear type mounting which preloads the buckling mounting in compression to a threshold several times the weight of the article carried in the container. Under shock loads, the article is stiffly supported by the buckling mounting until the shock exceeds the threshold, after which the article is dominantly cushioned by the relatively soft shear mounting. In a preferred form, shocks in opposite directions are cushioned.

In the drawing, FIG. 1 is a diagrammatic elevation of a preferred form of shipping container assembly, FIG. 2 is a load deflection curve for the shipping container assembly, FIG. 3 is a side elevation of a buckling type mounting, FIG. 4 is a load deflection curve for the buckling type mounting, FIG. 5 is a side elevation of a shear type mounting, and FIG. 6 is a load deflection curve for the shear mounting.

In the drawing, 1 indicates the envelope of a shipping container and 2 indicates the article supported in the container by relatively soft shear type mountings 3 and by relatively stiff buckling type mountings 4. The mountings cushion shocks in vertical directions indicated by arrows 5 and 6.

The shear type mounting as shown in greater detail in FIG. 5 comprises plates 7, 8 bonded to opposite ends of a body 9 of elastomer. This type of mounting is well known and has the load deflection curve 10 of FIG. 6. By way of example, a load applied to plate 7 of magnitude indicated by the numeral 11 deflects the body 9 in shear to the position shown by dotted lines 12, while a load of magnitude indicated by the numeral 13 deflects the body 9 in shear to the position indicated by dotted lines 14. The load deflection curve 10 is essentially a straight line.

The buckling type mountings 4 shown in greater detail in FIG. 3 comprise plates 15, 16 bonded to opposite ends of a column 17 of elastomer. A load applied to plate 15 in the direction of arrow 18 and of magnitude indicated substantially by the numeral 19 causes deflection of the column 17 to the position indicated by dotted lines 20. During this initial deflection, the elastomer is loaded in compression and is relatively stiff. Because the height or length of the column 17 is relatively large compared to its minimum thickness, the column becomes unstable at the load indicated by the numeral 19 and buckles with little or no increase in load to the position indicated by dotted lines 21. The point at which the buckling takes place is determined by the length to thickness ratio. Appreciable buckling takes place when the length to thickness ratio is substantially two. More pronounced buckling takes place when the length to thickness ratio is larger. In commercial forms, the length to thickness ratio is frequently of the order of four. Upon reaching the position indicated by dotted lines 21, the elastomer is again loaded substantially in compression and becomes relatively stiff. The characteristic load deflection curve for the buckling type mounting is shown in FIG. 4 where line 22 indicates the initial stiff region between 15 and 20; line 23 indicates the buckling region between lines 20 and 21, and line 24 indicates the stiff compression region as the mounting is further loaded from the position shown by dotted lines 21.

The buckling and shear type mountings per se are well known.

In the shipping container of FIG. 1, the buckling type mountings 4 are arranged between the supported article 2 and the top wall 25 of the container. The plates 16 of the mountings are preferably fastened to the supported article 2 and the plates 15 merely rest against the top wall 25, although the connections could be reversed. The shear type mountings 3 are arranged between the supported article 2 and the side walls 26 of the container. The plates 8 are fixed to the side wall 26 and the plates 7 are fixed to the article 2. The shear mountings are preloaded to a force several times the weight of the supported article. By way of example, the preload of the shear type mountings 3 may be four times the weight of the supported article. This preload is attained by a substantial deflection of the shear type mountings, for example, that indicated by dotted lines 12 in FIG. 5. The preload is less than the buckling threshold of the buckling mountings 4 so that this preload force stresses the buckling mountings in compression. This results in a relatively small deflection such as indicated by dotted lines 20 in FIG. 3.

When the supported article is subjected to a force in the direction of arrow 5 and of magnitude less than the initial preload, the deflection is along line 27 and the article is accordingly in effect supported by very stiff springs. This is a desirable type of support for mobile equipment since it avoids resonance with road shocks and other disturbing forces commonly encountered in transportation equipment. When the load in the direction of arrow 5 equals the initial preload on the shear type mountings, the article 2 moves downward to the position indicated by dot-dash line 28 and the buckling type mountings are completely unloaded. Further deflection is along line 29 corresponding to the shear deflection of mountings 3. This provides a soft cushion for forces above the preload. In a shipping container where the shear mountings 3 are preloaded against buckling type mountings 4 to four times the weight of the supported article, the total deflection required to protect the article under a 36″ end drop to a force in the direction of arrow 5 equal to eight times its weight is approximately 3¼″. Of this 3¼″, ¼″ is the initial deflection due to the preload of the buckling type mountings. To achieve the same protection using only shear type mountings would require a deflection of approximately 4½″. Reducing the motion of the supported article reduces the size, weight and cost of the container without decreasing the protection. Another advantage of the system is that change of position of the supported article due to drift or cold flow of the elastomer is less than that encountered in a mounting system using only shear type mountings. The greater stiffness of the buckling type mountings under the weight of the supported article resists cold flow or drift of the elastomer.

When the article 2 is subjected to forces in the direction of arrow 6, the initial load deflection is along a continuation of line 27. Upon reaching point 30, the mountings 4 buckle and thereafter the load deflection is along line 31 representing the combined shear spring rate of the shear mount and the buckling rate of the compression mount. The performance for forces in the direction of arrow 6 is of the same kind as that for forces in the direction of arrow 5 and has the same advantages.

The mountings are shown for cushioning vertical forces but could be oriented to cushion forces in other directions if desired.

What is claimed as new is:

1. A mounting system comprising a supporting member, a supported member, a shear type elastomeric mounting connected in load carrying relation between the members, the shear mounting having a body of elastomer strained in shear by relative vertical movement of the members and said body being initially strained downward to a deflection corresponding to a preload several times the weight of the supported member whereby the shear mounting exerts an upward force on the supported member several times its weight, a buckling type elastomeric mounting connected between the members and having a column of elastomer sustaining the upward force from the shear mounting in compression, said column having a length to width ratio such as to buckle at compression loads above a threshold greater than said preload but less than the maximum shock to which the supported member is to be subjected, said buckling mounting at compression loads less than said threshold being several times as stiff as the shear mounting, and the connection between the buckling mounting and the article and container being free in the tension direction.

2. A mounting system comprising a container, a supported article within the container, shear type elastomeric mounting in load carrying relation between the article and the container, the shear mounting having a body of elastomer strained in shear by relative vertical movement of the article and container and being initially strained downward to a deflection corresponding to a preload several times the weight of the article whereby the shear mounting exerts an upward force on the article several times its weight, a buckling type elastomeric mounting connected between the article and the container and having a column of elastomer sustaining the upward force from the shear mounting in compression and having a length to width ratio such as to buckle at a threshold compression load greater than said preload but less than the maximum shock to which the article is to be subjected, said buckling mounting at compression loads less than said threshold being several times as stiff as the shear mounting, the connection between the buckling mounting and the article and container being free in the tension direction.

References Cited by the Examiner

UNITED STATES PATENTS

| | | | |
|---|---|---|---|
| 2,746,824 | 5/1956 | Bond | 217—53 |
| 3,154,704 | 10/1964 | Shaffer | 248—18 |

FOREIGN PATENTS

| | | |
|---|---|---|
| 566,381 | 12/1944 | Great Britain. |

THERON E. CONDON, *Primary Examiner.*

W. T. DIXSON, *Assistant Examiner.*